(12) United States Patent
Rau

(10) Patent No.: US 11,919,523 B2
(45) Date of Patent: Mar. 5, 2024

(54) SYSTEMS AND METHODS FOR DRIVER SCORING WITH MACHINE LEARNING

(71) Applicant: CALAMP CORP., Irvine, CA (US)

(72) Inventor: Amrit Rau, Irvine, CA (US)

(73) Assignee: CalAmp Corp., Irvine, CA (US)

( * ) Notice: Subject to any disclaimer, the term of this patent is extended or adjusted under 35 U.S.C. 154(b) by 219 days.

(21) Appl. No.: 17/335,619

(22) Filed: Jun. 1, 2021

(65) Prior Publication Data

US 2021/0284178 A1 Sep. 16, 2021

Related U.S. Application Data

(60) Division of application No. 16/551,453, filed on Aug. 26, 2019, now Pat. No. 11,021,166, which is a continuation of application No. 16/029,520, filed on Jul. 6, 2018, now Pat. No. 10,392,022.

(60) Provisional application No. 62/636,738, filed on Feb. 28, 2018.

(51) Int. Cl.
*B60W 40/09* (2012.01)
*B60W 40/12* (2012.01)
*G06N 20/00* (2019.01)
*H04W 4/44* (2018.01)

(52) U.S. Cl.
CPC ............ *B60W 40/09* (2013.01); *B60W 40/12* (2013.01); *G06N 20/00* (2019.01); *H04W 4/44* (2018.02)

(58) Field of Classification Search
USPC ........................................................ 340/439
See application file for complete search history.

(56) References Cited

U.S. PATENT DOCUMENTS

| 10,129,118 | B1 | 11/2018 | Ghare |
| 10,392,022 | B1 | 8/2019 | Rau |
| 11,021,166 | B2* | 6/2021 | Rau .......................... H04W 4/38 |
| 2014/0322676 | A1 | 10/2014 | Raman |
| 2015/0092056 | A1* | 4/2015 | Rau .......................... B60R 11/04 348/148 |
| 2016/0379485 | A1 | 12/2016 | Anastassov |
| 2017/0291611 | A1 | 10/2017 | Innes |
| 2017/0371608 | A1 | 12/2017 | Wasserman |

(Continued)

OTHER PUBLICATIONS

"E/E Diagnostic Test Modes", SAE International Surface Vehicle Recommended Practice, SAE Standard J1979, Issued Dec. 1, 1991, 19pgs.

(Continued)

*Primary Examiner* — An T Nguyen
(74) *Attorney, Agent, or Firm* — Barnes & Thornburg LLP

(57) ABSTRACT

Systems and methods for using machine learning classifiers to identify anomalous driving behavior in vehicle driver data obtained from vehicle telematics devices are provided. In one example, a vehicle telematics device receives vehicle driver data from sensors, identifies anomalies in the vehicle driver data by using an unsupervised machine learning process, calculates a driver risk score by using the anomalies identified in the vehicle driver data, and transmits the risk score to a remote server system. In another example, a server system receives vehicle driver data from a plurality of vehicle telematics devices, identifies anomalies in the vehicle driver data by using an unsupervised machine learning process, and calculates a driver risk score by using the anomalies identified in the vehicle driver data.

19 Claims, 18 Drawing Sheets

(56) References Cited

U.S. PATENT DOCUMENTS

2018/0111552 A1    4/2018  Neiswander
2018/0345981 A1*  12/2018  Ferguson ............... G07C 5/008
2019/0130664 A1    5/2019  Appel
2019/0263417 A1    8/2019  Rau

OTHER PUBLICATIONS

"OBD II Scan Tool", SAE International Surface Vehicle Recommended Practice, SAE Standard J1978, Issued Mar. 1, 1992, 13 pgs.
Liu et al., "Isolation Forests", 2008 Eighth IEEE International Conference on Data Mining, Dec. 15-19, 2008, Pisa, Italy, pp. 413-422, DOI:10.1109/ICDM.2008.17.

* cited by examiner

1000

Ex. Driver A has the following features:

| | | |
|---|---|---|
| Speeding | 25% | Outcome: Had accident and made insurance claim |
| Hard accel | 60% | |
| Hard decel | 40% | |

1020

Ex. Driver B has the following features:

| | | |
|---|---|---|
| Speeding | 15% | Outcome: Did not have accident |
| Hard accel | 40% | |
| Hard decel | 60% | |

FIG. 10

SYSTEMS AND METHODS FOR DRIVER SCORING WITH MACHINE LEARNING

CROSS-REFERENCE TO RELATED APPLICATION

This application is a divisional of and claims priority to U.S. patent application Ser. No. 16/551,453, entitled "Systems and Methods for Driver Scoring with Machine Learning," now U.S. Pat. No. 11,021,166, which was filed on Aug. 26, 2019 and which is a continuation of U.S. patent application Ser. No. 16/029,520 entitled "Systems and Methods for Driver Scoring with Machine Learning," now U.S. Pat. No. 10,392,022, which was filed on Jul. 6, 2018, which claims the benefit of U.S. Provisional App. No. 62/636,738 entitled "Systems and Methods for Driver Scoring with Machine Learning," which was filed on Feb. 28, 2018, each of which is expressly incorporated herein by reference.

FIELD

The embodiments relate to generating a risk score for vehicle drivers by using accumulated vehicle data and unsupervised machine learning classifiers.

BACKGROUND

Telematics is the integrated use of telecommunications and informatics. Telematics units are installed in vehicles to provide a variety of telematics functionality in the vehicle. This functionality includes, but is not limited to, emergency warning systems, navigation functionality, safety warnings, and automated driving assistance. Telematics units are also capable of recording vehicle information/data related to the operation of the vehicle and providing that information for analysis, whether in real-time or not, such as during a time when the vehicle is being serviced. The vehicle information/data (telematics data) generated by a telematics unit can be used in a variety of applications, such as fleet tracking, shipment tracking, insurance calculations, and in vehicle management and service.

SUMMARY

The embodiments are best summarized by the claims that follow below. Briefly, systems and methods are disclosed for generating driver risk scores by using adaptive models with machine learning classifiers.

BRIEF DESCRIPTION OF THE DRAWINGS

FIG. 10 illustrates example training data for a supervised machine learning system.

DETAILED DESCRIPTION

Turning now to the drawings, systems and methods for risk scoring for a vehicle operator (e.g., driver) by using unsupervised machine learning classifiers in accordance with embodiments that are disclosed. Many vehicles are equipped with a telematics device which can collect a variety of sensor data. This data can be analyzed to produce a driver risk score, based on past information, to predict future driving risks.

Vehicle telematics systems in accordance with a variety of embodiments can utilize a variety of advance machine learning techniques to identify driver behavior and generate driver risk scores that more accurately assess a particular driver's risk than prior art techniques. Unsupervised learning classifiers (e.g., isolation forests and/or other classifiers) can identify relationships in uncategorized vehicle driver data to produce a driver risk score, in accordance with the embodiments. Unsupervised learning classifiers can detect anomalies in vehicle driver data by isolating anomalies from normal points in the data set. These anomalies in data points can generally indicate safe or unsafe driver behavior. While an individual unsafe data point may not indicate a risky driver, a collection of unsafe data points can start to indicate a risk. In several embodiments, isolation forests, an unsupervised learning machine learning classifier, can be used to detect such anomalies. Isolation forests, which are discussed in detail herein, can make random divisions of a data set while detecting anomalies. Several isolation forests constructed for the same data set will each individually make different random choices and therefore each isolation forest can be slightly different. In some embodiments, the system can combine the output of a group of isolation forests by using an ensemble learning process to generate a driver risk score.

Systems and methods for driver risk scoring by using unsupervised machine learning classifiers in accordance with the disclosed embodiments are described in more detail herein.

Vehicle Telematics Systems

Figure 1:
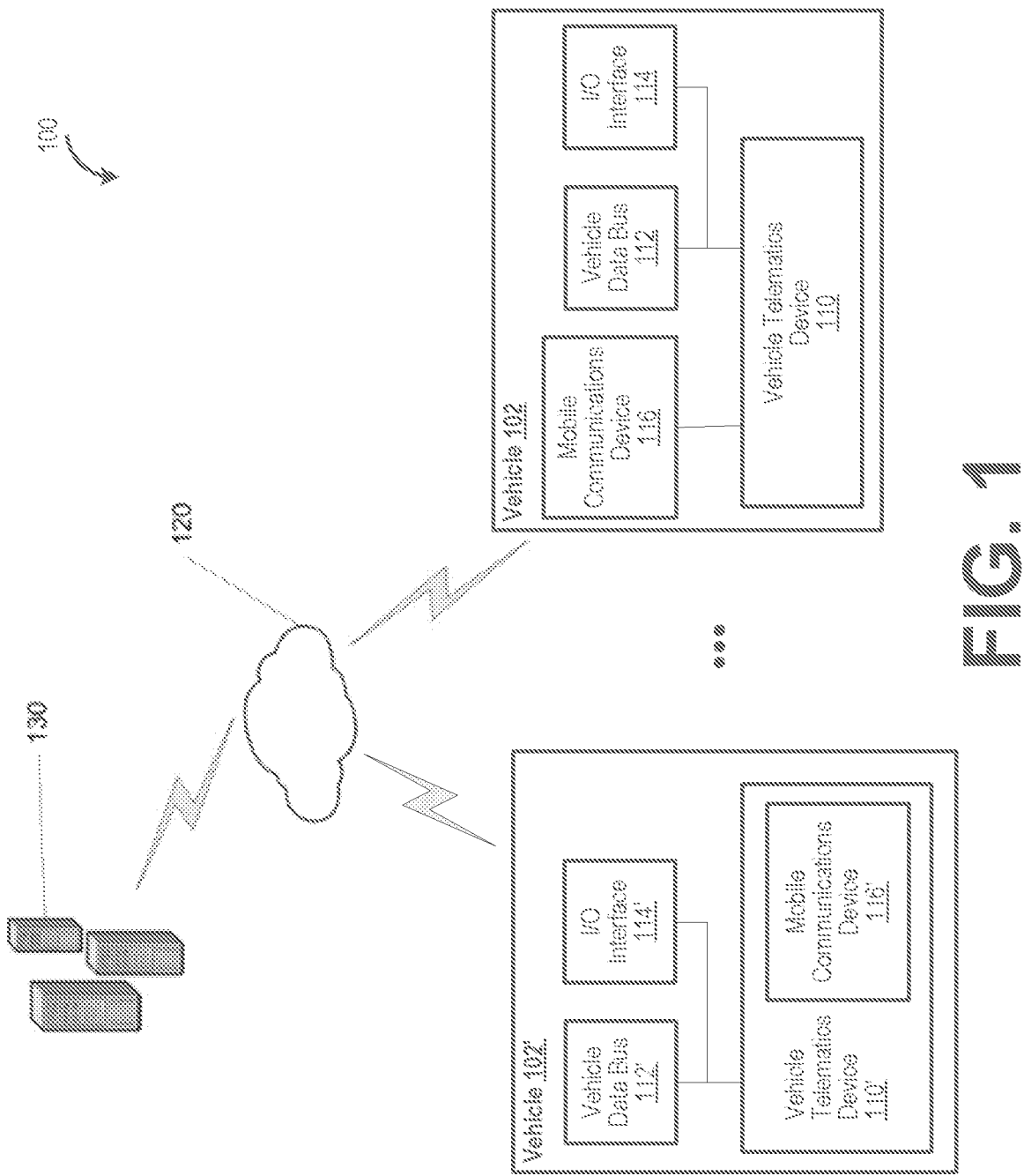
FIG. 1 is a diagram conceptually illustrating vehicle telematics system that can be used to generate driver risk scores.

FIG. 1 is a conceptual diagram of a vehicle telematics system 100, in accordance with an embodiment. Vehicle telematics systems described herein can use a variety of data regarding the operation of a vehicle to generate a operator risk score (e.g., driver risk score) for the operator (e.g., driver) of the vehicle. The vehicle telematics system 100 includes one or more vehicle telematics devices (110, 110', etc.) typically mounted in or on a vehicle (102, 102', etc.).

For explanatory purposes, the embodiments are described herein by using vehicles operated by drivers. A driver is a vehicle operator of various types of vehicles. A vehicle operator can be a vehicle driver, a ship captain, an airplane pilot, a drone pilot, a motorcycle rider, a bicycle rider, an automated operator, and/or a remote operator, among other operators. A vehicle (102, 102', etc.) can be any car, truck, bus, train, airplane, helicopter, drone, motorcycle, bicycle, watercraft, land craft, and/or aircraft, among other vehicles. A vehicle (102, 102', etc.) can be manned, unmanned, motorized, unmotorized, directly operated, remotely operated, artificial intelligence operated, self-driving, self-flying, and/or self-sailing, among other things. A vehicle can be operated by an operator (e.g., driver) and/or operated at least in part by an automated system (e.g., self-driving system, etc.).

Many other configurations of the vehicle 102 are within the scope of the present technology. As one of many examples, FIG. 1 shows the vehicle 102' including a vehicle telematics device 110' having a mobile communication device 116'. The vehicle telematics device 110' is coupled to a vehicle data bus 112' and an I/O interface 114'. The devices 110', 112', 114', and 116' function like the devices 110, 112, 114, and 116, but may have different physical configurations.

The vehicle telematics device 110 can be coupled to a connector and/or a wire harness in communication with a vehicle data bus 112 of the vehicle 102 to obtain power and exchange signals with one or more vehicle devices or sensors. The vehicle telematics device 110 can further be coupled to a wired or wireless input/output (I/O) interface 114 and/or a mobile communications device 116 as appropriate to the requirements of specific applications of the embodiments.

In a variety of embodiments, the vehicle telematics device 110 communicates with the remote server system 130 via the mobile communications device 116 over a network 120. In a variety of embodiments, the network 120 is the Internet. In many embodiments, the network 120 is any wired or wireless network, such as a cellular network, between the vehicle telematics device 110 and/or the remote server system 130. In a number of embodiments, the remote server system 130 is implemented by using a single server system. In several embodiments, the remote server system 130 is implemented by using multiple server systems.

In a variety of embodiments, the vehicle telematics device 110 is installed in a vehicle 102 having the vehicle data bus 112. In several embodiments, the vehicle telematics device 110 is connected to a vehicle diagnostic connector that provides access to the vehicle data bus 112. The vehicle telematics device 110 can obtain data from any of a variety of vehicle devices connected to the vehicle data bus 112 utilizing any of a variety of techniques as appropriate to the requirements of specific applications of embodiments. Vehicle devices can include, but are not limited to, engine sensors, electronic control unit (ECU) devices, alternator sensors, vibration sensors, voltage sensors, oxygen sensors, Global Positioning System (GPS) receivers, ignition devices, weight sensors, wireless network devices, and/or acceleration determination devices. Systems and methods for connecting to a vehicle data bus that can be utilized in accordance with the embodiments are described in SAE J1978, titled "OBD II Scan Tool," first published by SAE International of Troy, Michigan on Mar. 1, 1992 and last updated Apr. 30, 2002. Systems and methods for obtaining data from devices connected to a vehicle data bus are described in SAE J1979, titled "E/E Diagnostic Test Modes," first published by SAE International on Dec. 1, 1991 and last updated Aug. 11, 2014. The disclosures of SAE J1978 and SAE J1979 are hereby incorporated by reference in their entirety. In a number of embodiments, the vehicle telematics device is connected directly, either wired or wirelessly, to one or more sensors within the vehicle 102 and/or does not utilize the vehicle data bus 112.

The vehicle telematics device 110 can include any of a variety of sensors and/or devices, including those described herein with respect to the vehicle data bus and any described in more detail herein, to obtain data regarding the status of the vehicle and its environment. The vehicle telematics device 110 can also communicate with any of a variety of sensors and/or devices by using the I/O interface 114. The I/O interface 114 can be any connection, including wired and wireless connections, as appropriate to the requirements of specific applications of the embodiments.

In several embodiments, the vehicle telematics device 110 is capable of executing scripts to read data and/or perform particular processes. These scripts can be pre-loaded on the device and/or obtained from the remote server system 130, vehicle data bus 112, and/or the I/O interface 114 as appropriate to the requirements of specific applications of the embodiments. The vehicle telematics device 110 can be self-powered and/or connected into the electrical system of the vehicle 102 in which the vehicle telematics device 110 is installed. In a variety of embodiments, the vehicle telematics device is powered via the vehicle data bus 112 and/or the I/O interface 114.

In many embodiments, one of the sensor devices 240 of the vehicle telematics device 110 is a Global Positioning System (GPS) receiver in order to determine the location, speed, and/or acceleration of the vehicle 102. In many embodiments, one of the sensor devices 240 of the vehicle telematics device 110 is a multidimensional accelerometer to acquire acceleration and/or speed of the vehicle 102.

In a variety of embodiments, the vehicle telematics device 110 and/or remote server system 130 provides a user interface allowing for visualizing and interacting with the data transmitted and/or received between the systems. In several embodiments, the vehicle telematics device 110 and/or remote server system 130 provides an interface, such as an application programming interface (API) or web service that provides some or all of the data to third-party systems for further processing. Access to the interface can be open and/or secured by using any of a variety of techniques, such as by using client authorization keys, as appropriate to the requirements of specific applications.

Although a specific architecture of a vehicle telematics system in accordance with embodiments are discussed herein and illustrated in FIG. 1, a variety of architectures, including sensors and other devices and techniques not specifically described herein, can be utilized in accordance with embodiments. Furthermore, the processes described herein can be performed by using any combination the vehicle telematics device, mobile communications device, and/or the remote server systems as appropriate to the requirements of specific applications of the embodiments.

Vehicle Telematics Devices and Remote Server Systems

Figure 2A:
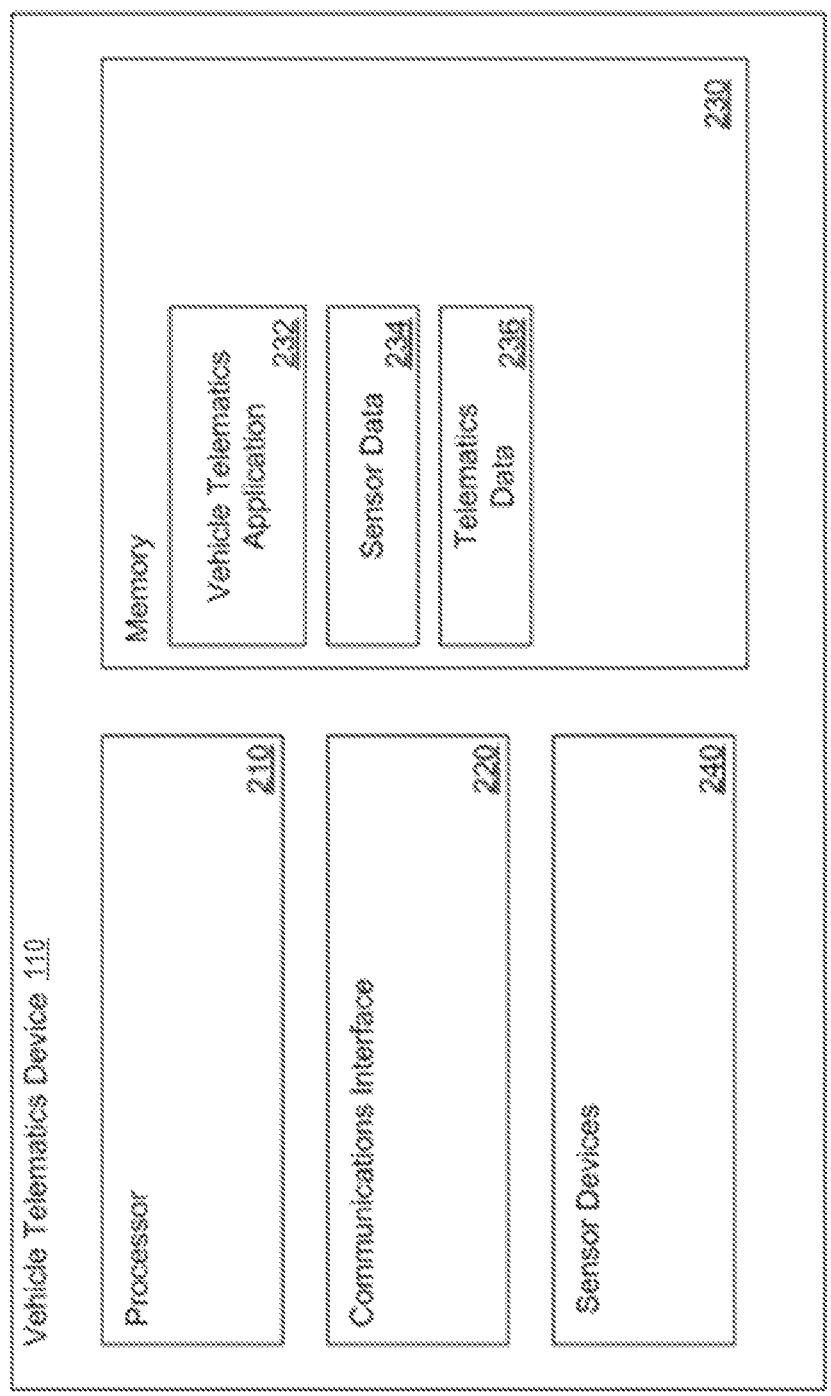
FIG. 2A is a block diagram illustrating a vehicle telematics device that can be used to generate vehicle data for computing driver risk scores.

FIG. 2A is a conceptual block diagram of the vehicle telematics device 110. Vehicle telematics devices and remote server systems in accordance with the embodiments can transmit and receive data regarding the performance of a vehicle and/or driver risk scores. The vehicle telematics device 110 includes a processor 210 in communication with memory 230. The vehicle telematics device 110 can also include one or more communication interfaces 220 capable of sending and receiving data. In a number of embodiments, the communication interface 220 is in communication with the processor 210, the memory 230, and/or the sensor device(s) 240. In several embodiments, the memory 230 is any form of storage configured to store a variety of data, including, but not limited to, a vehicle telematics application 232, sensor data 234, and telematics data 236. In many embodiments, the vehicle telematics application 232, sensor data 234, and/or telematics data 236 are stored by using an external server system and received by the vehicle telematics device 110 by using the communications interface 220.

Sensor devices 240 can include RPM sensors, voltage sensors, GPS receivers, noise sensors, vibration sensors, acceleration sensors, weight sensors, and any other device capable of measuring data regarding a vehicle as appropriate to the requirements of specific applications of the embodiments. Sensor devices 240 can be included within the vehicle telematics device 110 and/or located external to the vehicle telematics device 110. The vehicle telematics device 110 can communicate with external sensor devices by using the communications interface 220, such as via a vehicle data bus, I/O interface (including serial interfaces), mobile communications device, and/or a network connection as appropriate to the requirements of specific applications of embodiments. In a variety of embodiments, a vehicle telematics device is connected to a diagnostic connector (e.g. an OBD II port) in a vehicle. In some embodiments, information collected from sensor devices 240 and/or sensor data 234 can be used as vehicle driver data in a variety of machine learning processes for driver scoring as described in more detail herein. For example, vehicle driver data (e.g., raw data collected by vehicle telematics device) can include, without limitation, vehicle speed, acceleration data, and steering data over time and location for the detection of speeding, hard acceleration, hard deceleration, vehicle swerving, time of day, date, traffic information, weather, continuous hours driven. The system can combine raw data from a vehicle telematics device with server-generated data, such as location, time, date, weather, and/or other data. It should be readily appreciated by one having ordinary skill that these are merely illustrative examples and any such information can be used as appropriate to the requirements of specific applications.

Figure 2B:
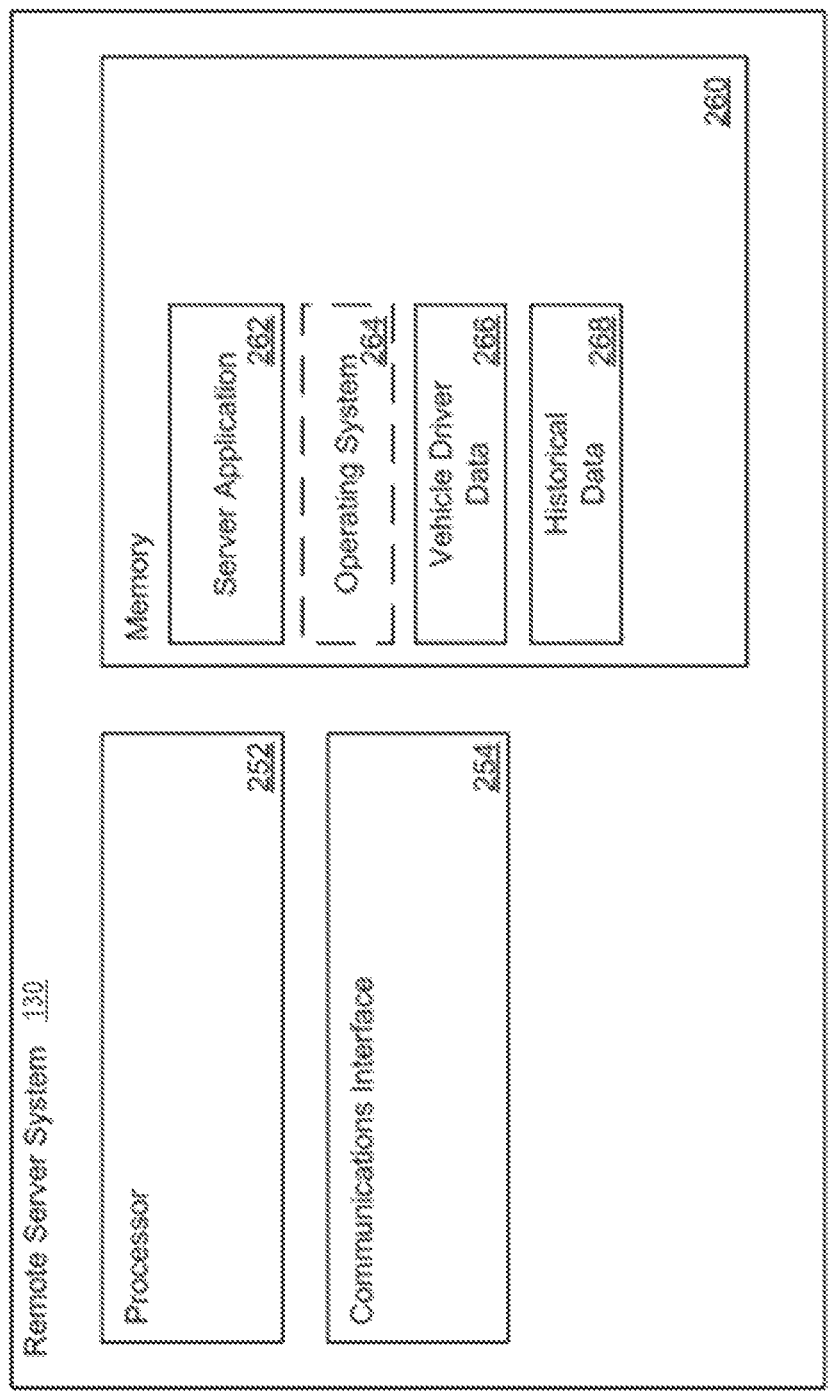
FIG. 2B is a block diagram illustrating a remote server system that can be used to accumulate vehicle driver data for a plurality of vehicles and drivers and compute driver risk scores.

FIG. 2B is a conceptual block diagram of a remote server system, in accordance with an embodiment. The remote server system 130 includes a processor 252 in communication with memory 260. The remote server system 130 can also include one or more communications interfaces 254 capable of sending and receiving, such as with a vehicle telematics device. In a number of embodiments, the communication interface is in communication with the processor 252 and/or the memory 260. In several embodiments, the memory 260 is any form of storage configured to store a variety of data, including, but not limited to, a server application 262, an operating system 264, vehicle driver data 266, and historical data 268. In many embodiments, the server application 262, an operating system 264, vehicle driver data 266, and/or historical data 268 are stored by using an external server system and received by the remote server system 130 by using the remote communications interface 254.

The processor 210 and processor 252 can be directed, by the vehicle telematics application 232 and the server application 262 respectively, to perform a variety of driver risk scoring processes. Driver risk scoring processes can include obtaining data vehicle driver data and generating driver risk scores by using a vehicle telematics device and/or a remote server system by using a variety of machine learning systems. Driver risk scoring processes that can be performed in accordance with embodiments are described in more detail herein.

Although specific architectures for vehicle telematics devices and remote server systems in accordance with embodiments are conceptually illustrated in FIGS. 2A-B, any of a variety of architectures, including those that store data or applications on disk or some other form of storage and are loaded into memory at runtime, can also be utilized. Additionally, any of the data utilized in the system can be cached and transmitted once a network connection (such as a wireless network connection via the communications interface) becomes available. In a variety of embodiments, a memory includes circuitry such as, but not limited to, memory cells constructed by using transistors, that are configured to store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Rule-Based Algorithms

Traditionally, rule-based algorithms calculate a driver risk score via algorithms that use manually inputted rules. Driver risk scores are manually calculated using rule-based algorithms with the data frequently forced into a bell curve to facilitate the calculation of the driver risk score. Examples of manually inputted rules are the following: "If the driver has more than ten instances of hard braking over seven days, then the driver risk score is reduced; and if the driver has less than three instances of hard braking over seven days, then the driver risk score is increased."

Unfortunately, there are several problems with manual, rule-based algorithms. A first problem is manual thresholding, which does not enable an accurate general application to different locales and diverse geography. For example, ten hard braking instances might be considered excessive in Omaha, Nebr., but might be considered low in New York City. So, it might be fair for the manual, rule-based algorithms to ding such a driver in Omaha, while it might by unfair to ding such a driver in New York City. A second problem with manual, rule-based algorithms is unjustified data transformations. For example, forcing the raw data received from vehicle telematics devices into a bell curve, for the sake of easy calculations, might not accurately reflect reality. A third problem with manual, rule-based algorithms is the rules are arbitrary, which leads to suboptimal algorithm performance. For example, a rule that states, for example, "ten instances of hard braking are excessive", may be a best guess by an expert. Unfortunately, such a best guess is highly unlikely to be better than an estimate that is empirically determined from raw data received from vehicle telematics devices. A fourth problem is that manually inputted rules incorporate human biases. For example, an expert in vehicle driving safety may consider hard left turns to be unsafe, when evidence may show hard left turns are not actually unsafe.

Supervised Machine Learning Systems

Traditionally, supervised learning classifiers may be used to identify relationships in labeled vehicle telematics information. A known (or labeled) set of vehicle telematics device information, which can be referred to as a training set, can be used to train the machine learning classifier. Once the machine learning classifier is trained by using the labeled training set, the machine learning classifier can classify unknown sets of vehicle telematics device information. Correctly classified information can be added to the training set to continuously improve the performance of the machine learning system. Similarly, information related to incorrectly classified vehicle telematics information can also be added to the training data set to improve the precision of the machine learning system.

Supervised machine learning classifiers analyze information collected by vehicle telematics devices to produce a driver risk score. Supervised learning classifiers identify relationships in labeled vehicle telematics information. A known (or labeled) set of vehicle telematics device information, which can be referred to as a training set, is used to train the machine learning classifier. Once the machine learning classifier is trained by using the labeled training set, the machine learning classifier classifies unknown sets of vehicle telematics device information. Correctly classified information is added to the training set to continuously improve the performance of the machine learning system. Similarly, information related to incorrectly classified vehicle telematics information is added to the training data set to improve the precision of the machine learning system.

Figure 8:
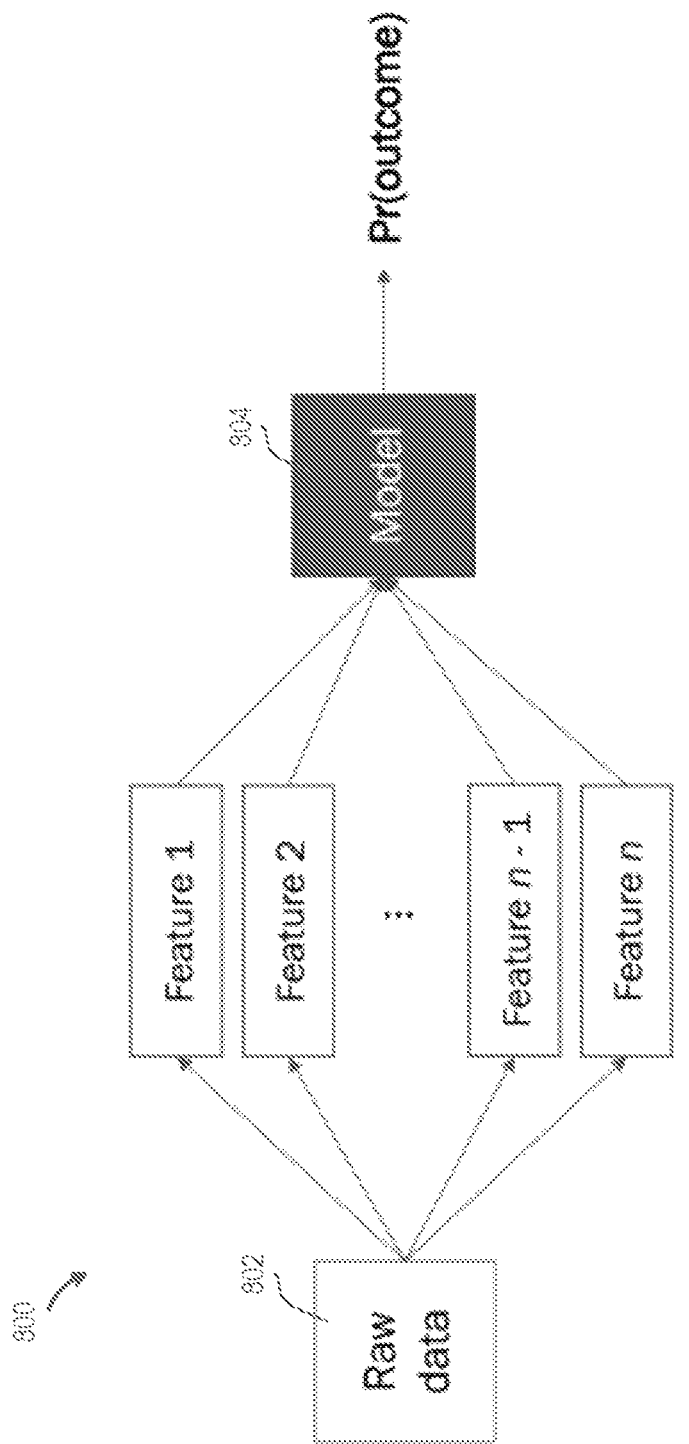
FIG. 8 is a conceptual block diagram of a supervised machine learning system.

FIG. 8 is a conceptual block diagram of a supervised machine learning system 800. The system 800 receives raw data 802 from one or more vehicle telematics devices. From the raw data 802, the system 800 performs feature extraction to generate Feature 1 through Feature n. Each feature is a description about the raw data 802. Example features are described with reference to FIG. 9. The system 800 inputs the features into a model 812, which predicts an outcome probability Pr(outcome).

Figure 9:
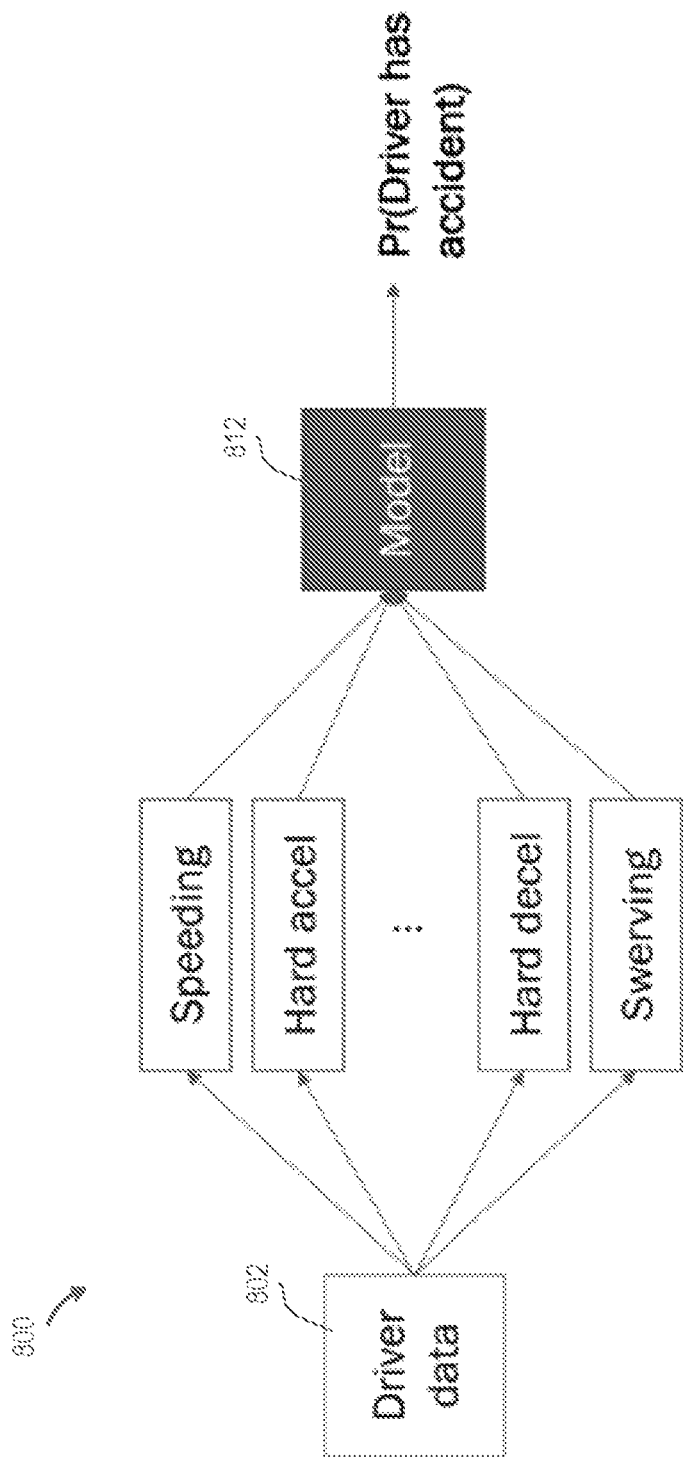
FIG. 9 is a conceptual block diagram the supervised machine learning system, including example information.

FIG. 9 is a conceptual block diagram of the supervised machine learning system 800, including example feature extraction of information from the available vehicle/driver data. The system 800 receives driver data 802 from one or more vehicle telematics devices. From the driver data 902, the system 800 performs feature extraction to generate a speeding description, a hard acceleration description, a hard deceleration description, a serving description, and so on. Each feature is a description about the driver data 802. At the feature extraction stage, the system 800 is not yet calculating a driver risk score. The system is, for example, keeping track of the number of times an event (e.g., speeding) occurs (e.g., frequency). In this example, the system inputs the features into a model 812, which predicts an outcome probability Pr(Driver has accident), which is the probability of the driver having an accident.

FIG. 10 illustrates example training data for a supervised machine learning system. Supervised learning involves procedures training the model, including providing labeled data to a model. When an outcome is known, the supervised system can label data points. In example 1000, Driver A has an outcome of an accident. Accordingly, the supervised system can label the following features for Driver A: speeding 25% of the driving time; hard accelerations 60% of acceleration time; and hard decelerations 40% of deceleration time. The supervised system labels those features as being associated with an accident. In example 1020, Driver B has an outcome of no accident. According, the supervised system applies a label to the following features for Driver B: speeding 15% of the driving time; hard accelerations 40% of acceleration time; and hard decelerations 60% of deceleration time. The supervised system labels those features as being associated with no accident, or the system does not those features. The supervised system can train the models for hundreds or thousands of labeled data points (e.g., labeled features).

Figure 11:
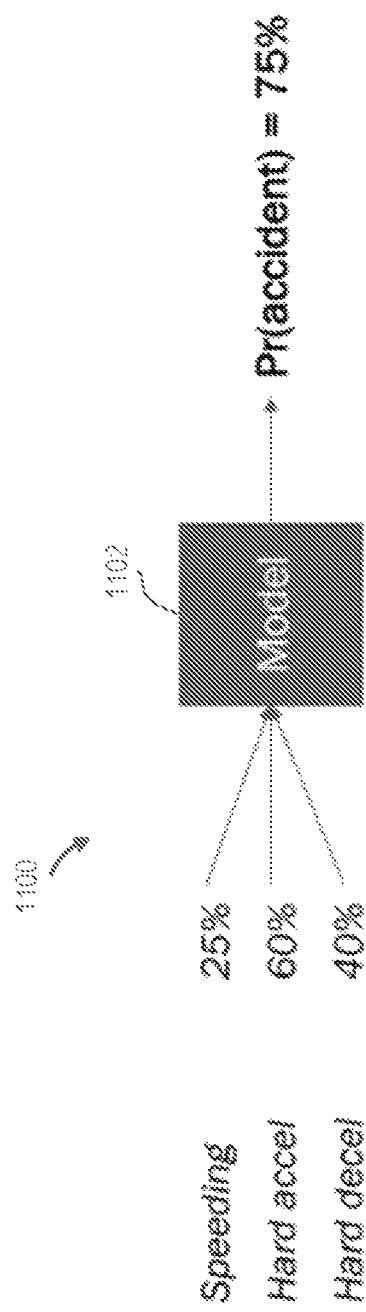
FIG. 11 is a conceptual block diagram of a system for testing the labeled training features of FIG. 10 and determining a biased driver risk score.

FIG. 11 is a conceptual block diagram of a system 1100 for testing the labeled training features of FIG. 10. The system generates a model 1102 based on labeled features, which are generated as discussed with reference to FIG. 10. As shown in FIG. 11, the system receives unlabeled data, input that unlabeled data into the model 1102, and generate a probability Pr(X), which is the probability of event X happening. In this example, the supervised system calculates an accident probability Pr(accident) equal to 75%, given the unlabeled data inputted into the trained model 1102.

Unfortunately, supervised machine learning requires an adequate amount of labeled historical data to train models. Meanwhile, a system may not have been labeling features when certain events occur (e.g., drivers get into accidents) over time in a database of historical driver data. Lack of an adequate database of historical labeled features, renders the supervised machine learning system inaccurate and unreliable.

Unsupervised Machine Learning Systems

Unsupervised machine learning systems, in accordance with embodiments, are designed to solve problems associated with rule-based algorithms and supervised machine learning systems. Unsupervised machine learning classifiers can analyze information collected by vehicle telematics devices to produce a driver risk score. Unsupervised learning classifiers (e.g., isolation forests and/or other classifiers) can identify relationships in uncategorized vehicle driver data to produce a driver risk score. Unsupervised learning classifiers can detect anomalies in vehicle driver data by isolating anomalies from normal points in the data set. These anomalies in data points can generally indicate safe or unsafe driver behavior. While an individual unsafe data point may not indicate a risky driver, a collection of unsafe data points can start to indicate a risk. In several embodiments, the system can use isolation forests, an unsupervised learning machine learning classifier, to detect such anomalies. Isolation forests, which are described herein, can make random divisions of a data set while detecting anomalies. Several isolation forests constructed for the same data set will each individually make different random choices and therefore each isolation forest can be slightly different. In some embodiments, the system can combine the output of a group of isolation forests by using an ensemble learning process to generate a driver risk score.

Figure 12:
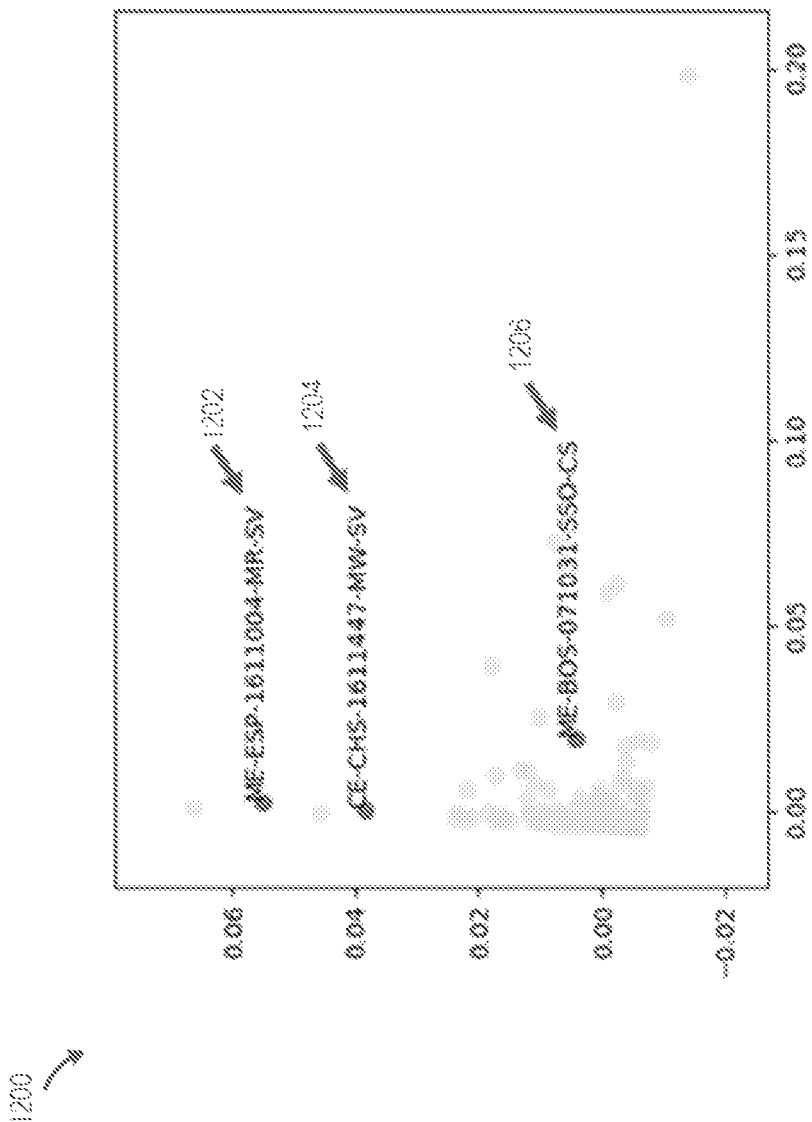
FIG. 12 shows an example plot of unlabeled data for different vehicles.

FIG. 12 shows an example plot 1200 of unlabeled data, in accordance with an embodiment. The axes do not mean anything specific. The plot 1200 is provided for explanatory purposes. The unsupervised system receives the unstructured, unlabeled data shown in the plot 1200. The unsupervised system calculates some sort of judgment in terms of "same versus different" for each unlabeled data point. In the example of FIG. 12, the unsupervised system determines data points 1202, 1204, and 1206 are "different" and determines all the other data points are "same".

Figure 13:
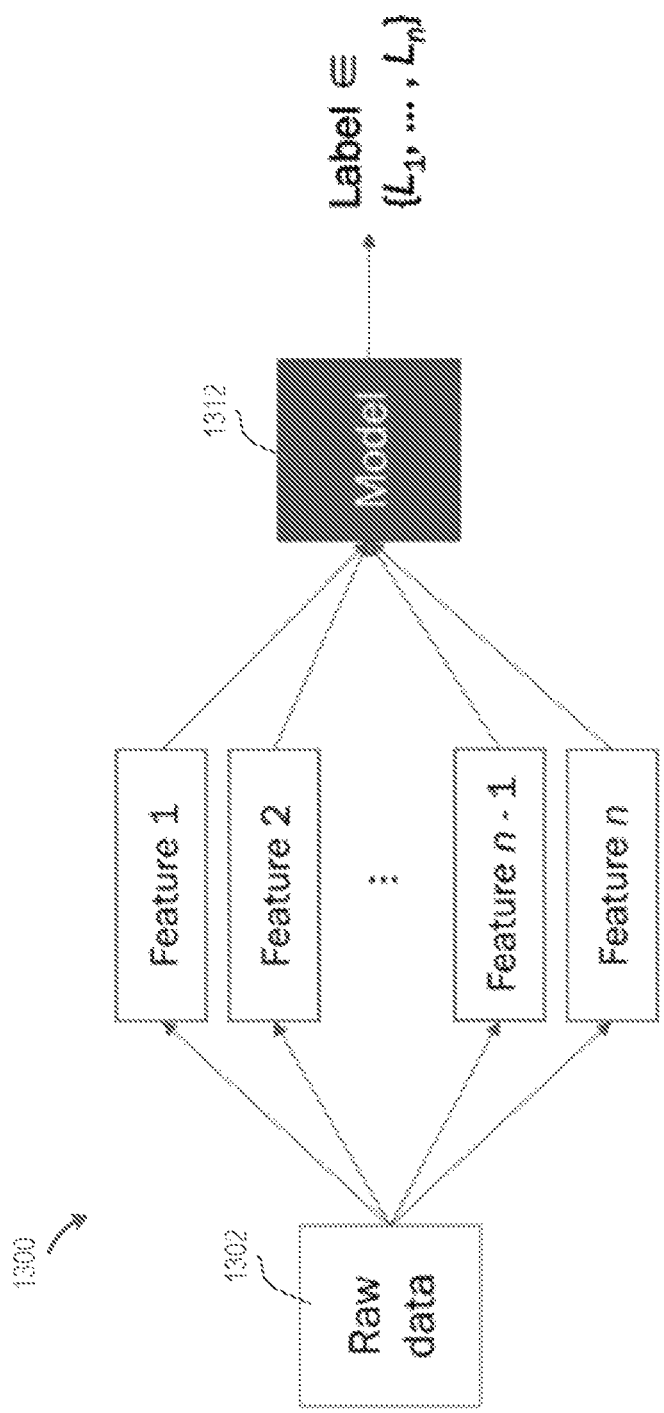
FIG. 13 is a conceptual block diagram of a generic unsupervised machine learning system.

FIG. 13 is a conceptual block diagram of an unsupervised machine learning system 1300, in accordance with an embodiment. The system 1300 receives raw vehicle driver data 1302 from one or more vehicle telematics devices. The system receives a set of features for data extraction. For example, a human can determine that the system 1300 will extract data associated with the following features: acceleration, deceleration, and speed. Each feature is a description about the vehicle driver data 1302. Example features are described with reference to FIG. 3. From the vehicle driver data 1302, the system 1300 performs feature extraction to generate data associated with Feature 1 through Feature n. The system 1300 inputs the features into a model 1312, which assigns a label (e.g., L1, Ln) to the data. The model 1312 includes any algorithm that uses a machine learning classifier to perform detection of anomalies (e.g., outliers, "different" data, etc.). Unsupervised learning classifiers for the model 1312 can include (but are not limited to) k-means clustering, mixture models, hierarchical clustering, anomaly detection, artificial neural networks, expectation-maximization algorithms, principal component analysis, independent component analysis, singular value decomposition, isolation forests, and/or a combination of unsupervised learning classifiers.

Figure 3:
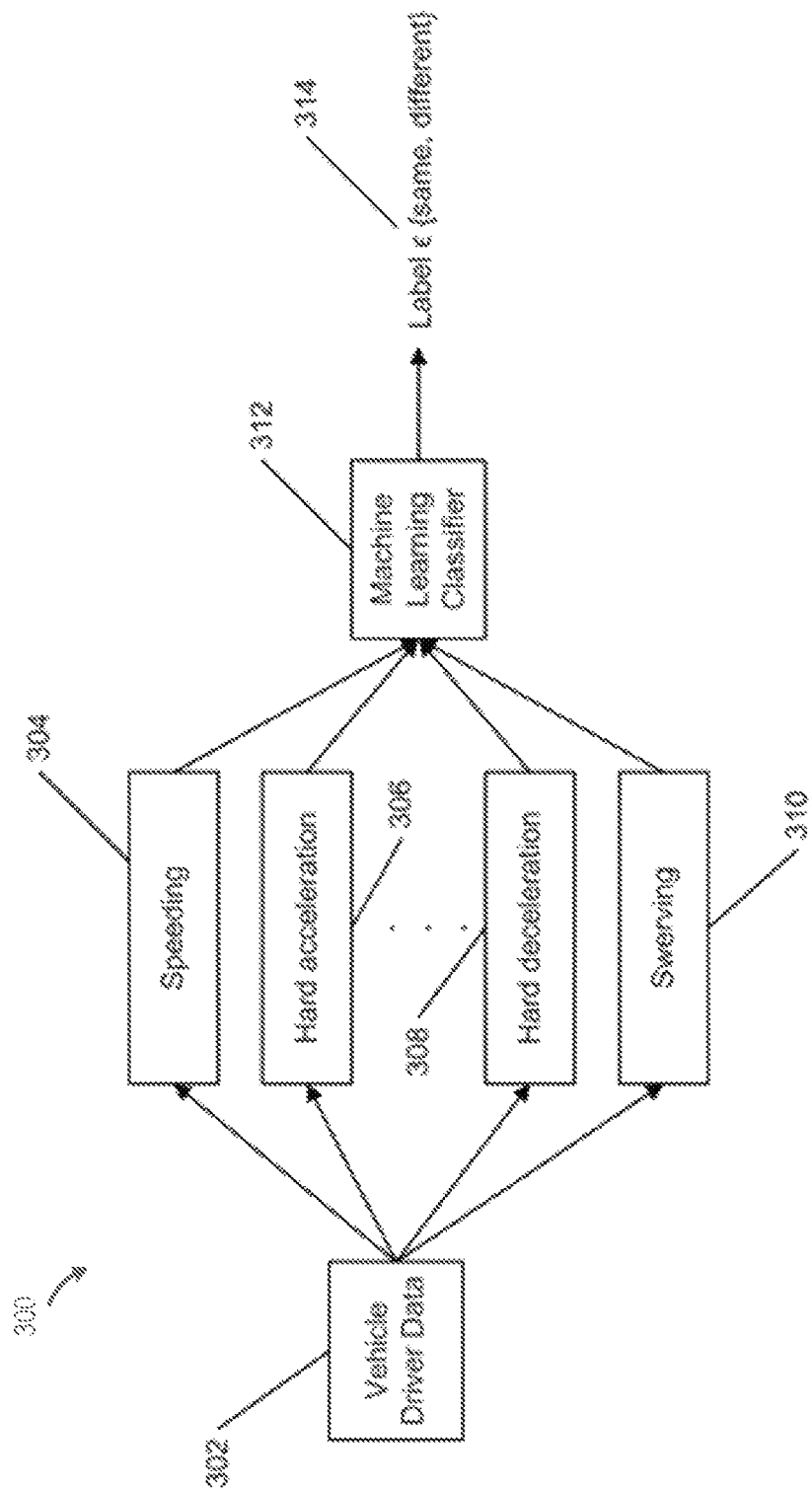
FIG. 3 is a conceptual block diagram of the unsupervised machine learning system, including example information that can be useful in computing driver risk scores.

FIG. 3 is a conceptual block diagram of an unsupervised machine learning system 300, including example driving features that may be extracted from the vehicle driver data in order that it may be classified. Machine learning systems in accordance with embodiments can receive vehicle driver data from a vehicle telematics device to identify baseline driver behavior and/or anomalies in the vehicle driver data. The machine learning system 300 includes vehicle driver data 302. The vehicle driver data 302 can include a variety of information such as speeding 304, hard acceleration 306, hard deceleration 308, and/or swerving 310, which is evidence about a driver's driving behavior or habits. An unsupervised machine learning classifier 312 can receive information as input and use it to generate a label 314. In some embodiments, label 314 can indicate anomalies in vehicle driver data such as labeling the data according to a binary decision (e.g., SAME or DIFFERENT). In various embodiments, SAME labels can indicate SAFE driver actions and/or DIFFERENT labels can indicate UNSAFE driver actions. Accordingly, the unsupervised system can operate under the assumption that an average driver (e.g., SAME driver) is a SAFE driver, while an anomalous driver (e.g., DIFFERENT driver) is an UNSAFE driver. However, it should be noted that any labels (including any number of labels) can be utilized as appropriate to the requirements of specific applications of embodiments.

An isolation forest is one technique, among others, to detect data anomalies (e.g., "different" data, outliers, etc.). Isolation forests are based on the fact that anomalies are data points that are few and different. Because of these properties, anomalies are susceptible to a mechanism called isolation. Isolation forests introduce the use of isolation as a more effective and efficient means to detect anomalies than the commonly used basic distance and density measures. Moreover, an isolation forest algorithm has a relatively low linear time complexity and a relatively small memory requirement, compared to other machine learning methods. An isolation forest algorithm can isolate observations by randomly selecting a feature and then randomly selecting a split value between the maximum and minimum values of the selected feature. Isolating anomaly observations is easier because only a few conditions are needed to separate those cases from the normal (e.g., "same") observations. On the other hand, isolating normal observations requires more conditions. Accordingly, an anomaly score can be calculated as the number of conditions required to separate a given observation. The isolation forest algorithm constructs the separation by creating isolation trees (e.g., random decision trees). Then, the system calculates a score as a path length to isolate the observation.

The unsupervised system 300 randomly builds many decision trees for each feature. The unsupervised system 300 then averages the tree distance between a point and its nearest neighbors. The clustering includes training observations, new regular observations, and new abnormal observations. The training observations represent training set data. The new regular observations represent driver behavior that the unsupervised system 300 may consider to be normal (e.g., "same"). The new abnormal observations represent driver behavior that the unsupervised system 300 may consider to be an anomaly (e.g., outlier or "different").

If using isolation forests, vehicle driver data is clustered according to the driving behaviors indicated in the vehicle driver data to identify baseline driver behavior. By clustering the vehicle driver data to identify large clusters of driver behavior and assign those as the baseline driver behavior, labels can be applied to the clustered vehicle driver data to identify safe drivers as most drivers do not regularly have accidents, so that these clusters identifying baseline driver behavior can identify a variety of characteristics of ordinary driving without relying on external labels being applied to the source data. Anomalies in the vehicle driver data can be identified by locating pieces of vehicle driver data that are statistically deviant from the baseline driver behavior. Additionally, the identification of baseline driver behavior can overcome a variety of difficulties in applying machine learning techniques when the vehicle driver data does not include labels identifying the vehicle driver data.

The unsupervised machine learning classifier 312 can include a variety of classifiers including (but not limited to) supervised learning classifiers, unsupervised learning classifiers, and/or a combination of several classifiers. Supervised learning classifiers can include (but are not limited to) artificial neural networks, nearest neighbor algorithms, decision trees, support vector machines, random forests, ensembles of classifiers, and/or a combination of supervised learning classifiers. In a variety of embodiments, supervised learning classifiers can be further adapted to be unsupervised learning classifiers for the identification of driver behavior classification as appropriate to the requirements of specific applications of embodiments. Unsupervised learning classifiers can include (but are not limited to) k-means clustering, mixture models, hierarchical clustering, anomaly detection, artificial neural networks, expectation-maximization algorithms, principal component analysis, independent component analysis, singular value decomposition, isolation forests, and/or a combination of unsupervised learning classifiers.

Additionally, machine learning classifiers can optionally use feature extraction to combine information in a way that still meaningfully represents the data. It should be readily apparent to one having ordinary skill in the art that many feature extraction techniques are available such as (but not limited to) principal component analysis, independent component analysis, isomap analysis, and/or partial least squares, and that feature extraction itself is optional.

Figure 4:
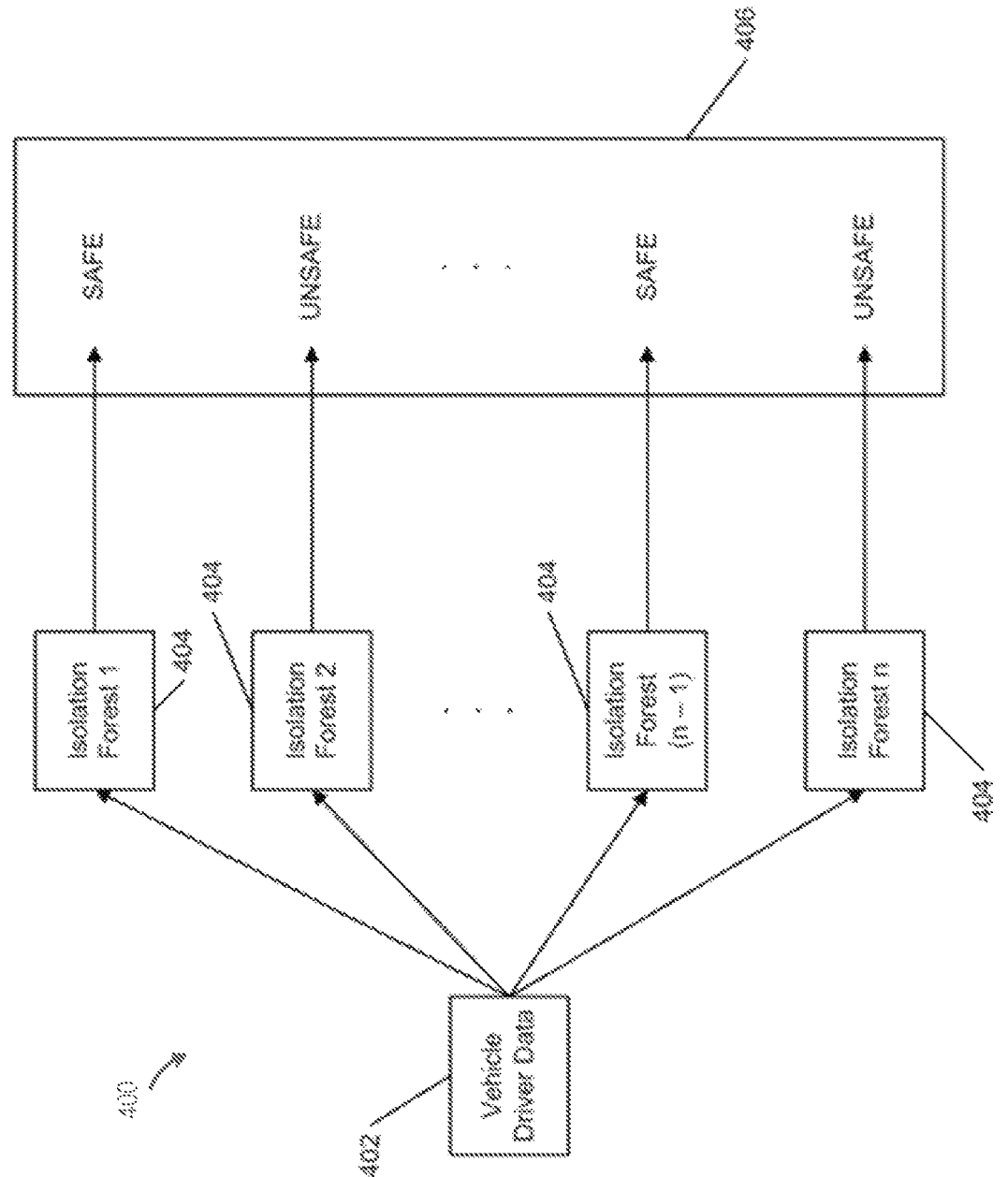
FIG. 4 is a conceptual block diagram of an unsupervised machine learning system using a plurality of isolation forests that can be used to identify safe and unsafe driving behavior.

FIG. 4 is conceptual block diagram of an unsupervised machine learning system 400, in accordance with an embodiment. The machine learning system 400 uses ensemble learning with isolation forests (e.g., ensemble of isolation forests) to generate driver risk scores. Isolation forests are shown for explanatory purposes. However, the machine learning system 400 can use any of a variety of machine learning classifiers to generate driver risk scores.

The unsupervised machine learning system 400 includes vehicle driver data 402. This driver data can be input one or more isolation forests 404. Isolation forests (or iForests) are an machine learning classifier that can detect anomalies in a data set rather than modelling normal points and are generally made of many isolation trees (or iTrees). In many embodiments, anomalies in vehicle telematics device information can be more susceptible to isolation than normal points. Information can be isolated through isolation trees. In a variety of embodiments, isolation trees are binary trees, although a variety of data structures can be utilized to express isolation trees as appropriate to the requirements of specific applications of embodiments. An attribute can randomly be selected at each node and a random split point can be chosen that can divide the data set into two sub-regions. This process can be repeated until every point in the data set is isolated from the rest of the points. The top of an isolation tree will generally contain points that are isolated quickly.

An isolation forest classifier can construct many isolation trees, each slightly different due to the random split points. Anomalies in a data set are generally points that have a shorter average path length than normal points in a set of isolation trees within an isolation forest. Detected anomalies within isolation forests can be used to label an isolation forest as SAFE and/or UNSAFE. Systems and methods for generating isolation forests are described in "Isolation Forests" to F. T. Liu, K. M. Ting, and Z.-H. Zhou in Proc. ICDM 2008, pages 413-422, 2008, the disclosure of which is hereby incorporated by reference in its entirety. In some embodiments, the output of many isolation forests can be aggregated to generate a driver risk score by using ensemble scoring.

Although specific systems for using machine learning classifiers in accordance with embodiments are shown in FIG. 3 and systems for generating driver risk scores by using isolation forests are described herein with respect to FIG. 4, the system can use any of a variety of machine learning classifiers to generate driver risk scores, in accordance with embodiments.

The system can parallelize the computations of the machine learning classifiers (e.g., ensemble isolation forests) across as many processing cores that are available. For example, if a server has n processors, then each of the n processors can work to perform computations for one machine learning classifier (e.g., one isolation forest).

Figure 14:
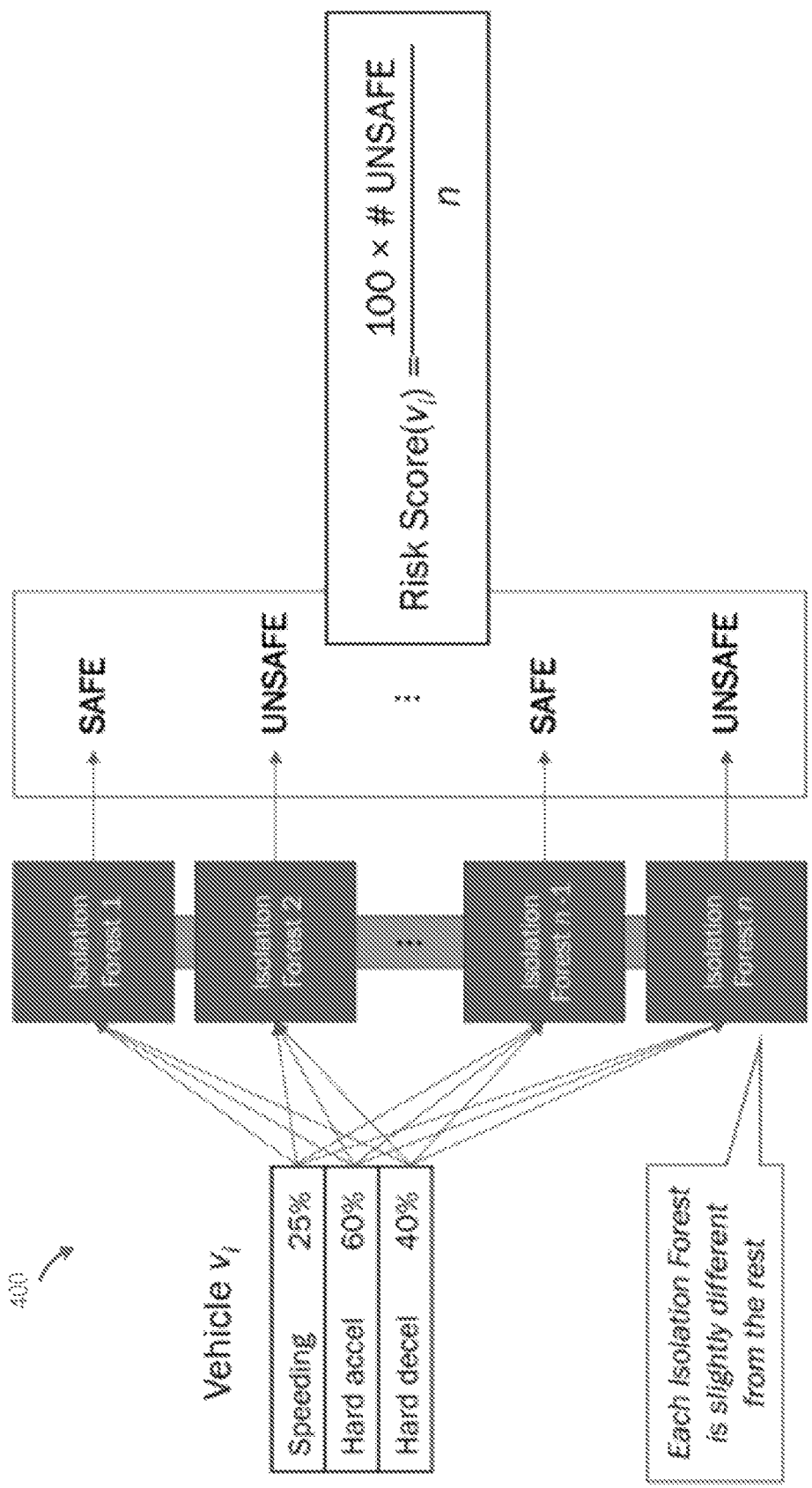
FIG. 14 is another conceptual block diagram of the unsupervised machine learning system for determining driver risk scores.
Figure 15:
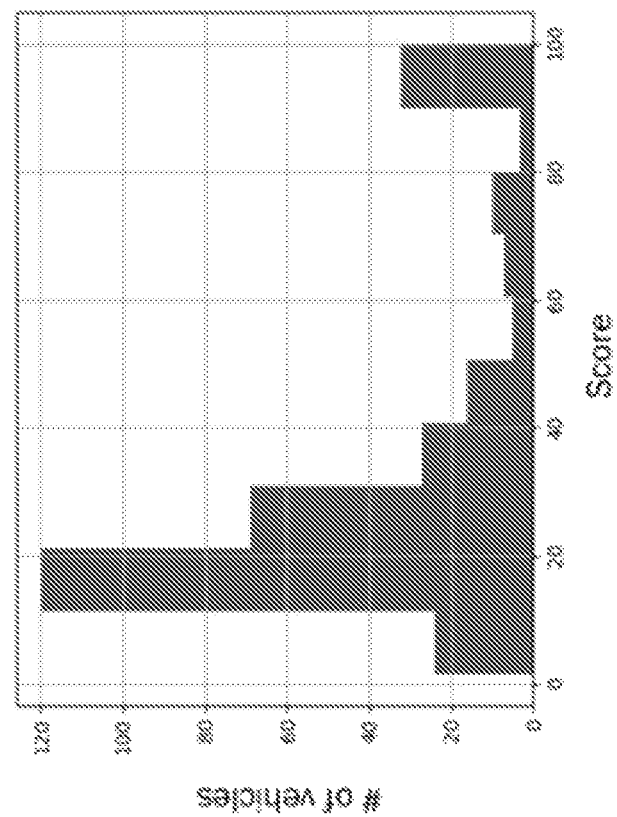
FIG. 15 is an example score distribution that may be determined.

FIG. 14 is another conceptual block diagram of the unsupervised machine learning system 400, in accordance with an embodiment. FIG. 15 illustrates how the unsupervised system can calculate a driver risk score. The system 400 sends each data point to multiple isolation forest. Each isolation forest is different from the rest. The system 400 calculates a risk score based on the one or more labels generated by the one or machine learning classifiers, which are isolation forests in the example of FIG. 14. The driver risk score is further described with reference to FIG. 6.

FIG. 15 is an example score distribution 1500, in accordance with an embodiment. In this example, the system filters data to consider a population of 313 sedans. The filtering is an attempt to compare similar vehicles. For example, it would be inappropriate to compare sedans with dump trucks. The system considers raw data captured by vehicle telematics devices over the course of one month. The system uses the following features: acceleration, deceleration, and speed, which are discussed with reference to FIG. 3. The system uses the ensemble isolation forest method, which is described with reference to FIG. 4. This example uses two hundred and fifty-six (256) isolation forest votes for the score distribution 1500. As shown in FIG. 15, about 23 vehicles had a score between 2 and 10; about 120 vehicles had a score between 11 and 20, and so on.

Figure 16:
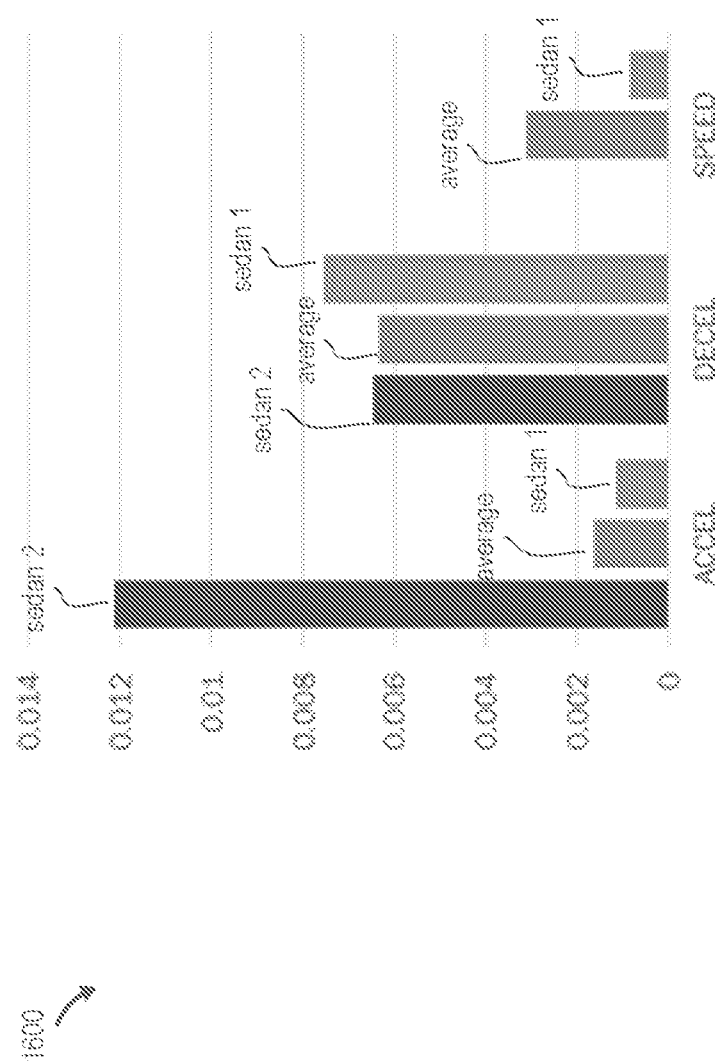
FIG. 16 is a chart to compare results of vehicle behavior (e.g., driver behavior) for three factors.

FIG. 16 is a comparison 1600 of results of vehicle behavior (e.g., driver behavior), in accordance with an embodiment. The system uses the following features: acceleration, deceleration, and speed, which are discussed with reference to FIG. 3. The numbers on the vertical axis represent normalized scores. Regarding the acceleration feature, a sedan 2 is relatively far away from the average acceleration, while a sedan 1 is relatively close to the average acceleration. Regarding the deceleration feature, sedan 2 is close to the average deceleration, while sedan 1 is also not too far away from the average deceleration. Regarding speed, there is no data for sedan 2, while sedan 1 is not that far away from the average speed. Accordingly, for sedan 1, the system calculates a driver risk score of 9, which indicates a relatively low level of risk. For sedan 2, the system calculates a driver risk score of 95, which indicates a relatively high level of risk. Note that magnitude and spectral differences. Isolation forests can learn spectral patterns as well as dynamic thresholds.

Figure 17:
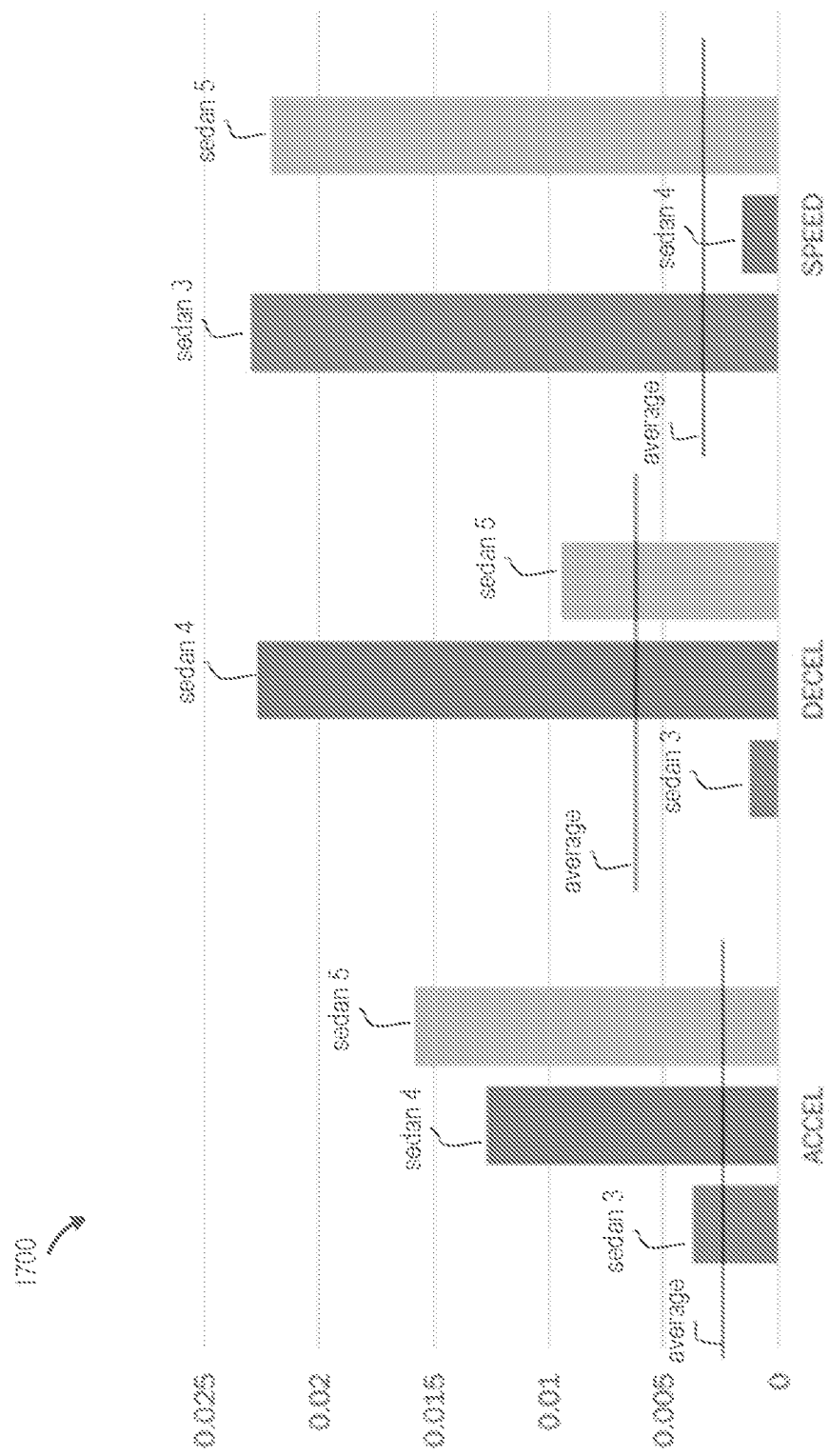
FIG. 17 is a chart to compare the results of vehicle behavior with an average to determine safe, average, and unsafe drivers.

FIG. 17 is a comparison 1700 of results of vehicle behavior associated with unsafe drivers, in accordance with an embodiment. The system uses the following features: acceleration, deceleration, and speed, which are discussed with reference to FIG. 3. The numbers on the vertical axis represent normalized scores. In this example, the behaviors of sedan 3, sedan 4, and sedan 5 are compared. Each sedan (e.g., driver) is substantially far away from the average acceleration, the average deceleration, and/or the average speed. Accordingly, the system calculates each sedan to be associated with a driver risk score of 100, which indicates the highest rating for the level of risk.

Methods of Driver Risk Scoring with Unsupervised Machine Learning

Figure 5:
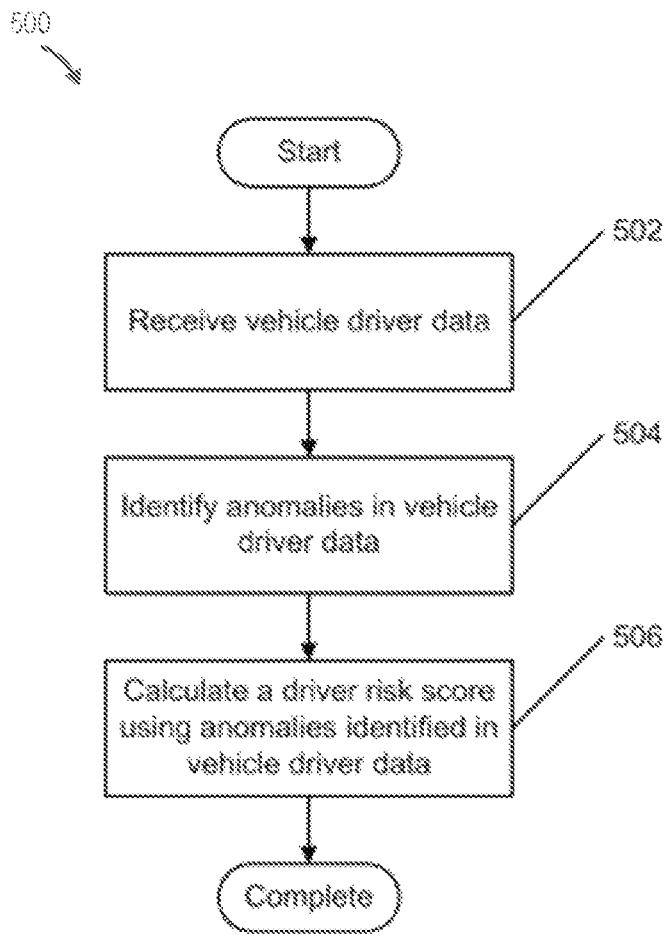
FIG. 5 is a flowchart of a method for determining driver risk scores, in accordance with one embodiment.

FIG. 5 is a flowchart of a method 500 for determining driver risk scores, in accordance with an embodiment. Driver risk scoring processes can include gathering vehicle driver data from sensor devices and calculating driver risk scores. The system receives (502) vehicle driver data by (but not limited to) a vehicle telematics device and/or a remote server system. A vehicle telematics device can receive vehicle driver data directly from vehicle telematics device sensors. Additionally, a vehicle telematics device can receive vehicle driver data, such as (but not limited to) historical driver data, from a remote server system. Similarly, a remove server can receive vehicle driver data from a plurality of vehicle telematics devices that is collected by one or more sensors of the vehicle telematics devices.

The system identifies (504) anomalies in vehicle driver data with an adaptive machine learning model. In many embodiments, the model includes a machine learning classifier, such as (but not limited to) an unsupervised learning machine learning classifier, that can label points in the driver data that are the SAME (part of a cluster) and DIFFERENT (an anomaly). Driver data labeled SAME can indicate SAFE driver actions. Similarly, driver data labeled DIFFERENT can indicate UNSAFE driver actions. A vehicle telematics device can receive the adaptive machine learning model, such as (but not limited to) coefficients of the model, from a remote server system.

The system calculates (506) a driver risk score by using anomalies identified in vehicle driver data. This calculation can be performed by (but is not limited to) one or more processors within the vehicle telematics device. This calculation can alternatively or additionally be performed by one or more processors of the remote server system.

A driver may receive feedback from the telematics device in real time about his driving behavior. The driver may receive a warning (e.g. visible warning light, audible message, vibration from vibrator) from the telematics device if his/her driver score is unsafe or a periodic compliment (e.g. visible positive reinforcement light, audible message, vibration from vibrator) if the driver score is safe or improves. The feedback regarding driving behavior may be sent remotely from the remote server system to the telematics device and provided to the user with driver risk score calculations being performed by the remote server system.

In some embodiments, an individual driver can be tracked across several vehicles to calculate a driver risk score. In such cases, vehicle driver data from multiple vehicles can be used to calculate a driver risk score. Alternatively, a driver risk score can be calculated for an individual vehicle for a specific date range. In some embodiments, a driver risk score for a vehicle from two date ranges can be compared to see if driving has improved or become riskier.

Although a variety of processes for generating a driver risk score are discussed with respect to FIG. 5, any of a variety of processes capable of identifying risks from anomalies and clusters in vehicle driver data can be utilized as appropriate to the requirements of specific applications in accordance with several embodiments.

Figure 6:
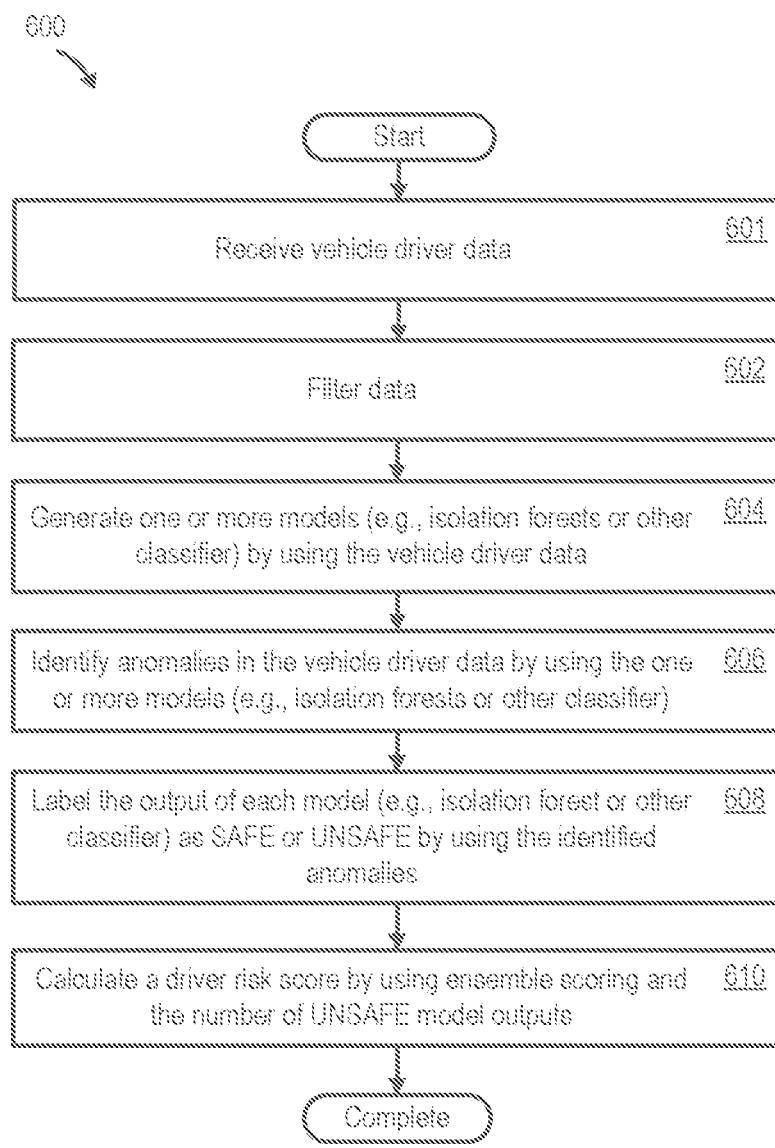
FIG. 6 is a flowchart of a method for calculating a driver risk score by using machine learning classifiers (e.g., isolation forests and/or other classifiers) and ensemble scoring, in accordance with another embodiment.

FIG. 6 is a flowchart of a method 600 for calculating a driver risk score by using machine learning classifiers (e.g., isolation forests and/or other classifiers) and ensemble scoring, in accordance with an embodiment. Driver risk scoring processes can include any of a variety of machine learning classifiers to identify anomalies and clusters in vehicle driver data. Anomalies in vehicle driver data are distinguishable from the clusters of vehicle driver data. Isolation forests are just one example of machine learning classifiers that can be used to distinguish clusters of vehicle driver data from anomalies in vehicle driver data. The anomalies are the outliers from the clusters generated with the models.

The system can receive (601) vehicle driver data. For example, a remote server system can receive vehicle driver data from a plurality of vehicle telematics devices. As another example, a vehicle telematics device, or a computing device coupled to the vehicle telematics device, can receive vehicle driver data from sensors and/or from a remote server system. The remote server system, the vehicle telematics device, and/or another computing device can receive vehicle driver data periodically, or in real time as a driver is driving a vehicle.

The system can filter (602) the received vehicle driver data so that proper comparisons are made between similar vehicles. For example, the system can filter data so that sedan to sedan comparisons are made with the data, and data from sedans are not compared with data from dump trucks. As another example, the system can filter data so that a sports car is compared to other sports cars, and not to pickup trucks. However, embodiments are not limited to these examples. Any filtering is permissible to compare any vehicle type.

The system generates (604) one or more unsupervised machine learning models by using the vehicle driver data. The models are used to classify the vehicle driver data to identify clusters and distinguish anomalies with little to no bias. One such unsupervised machine learning model that can be used is isolation forests.

The system identifies (606) anomalies in the vehicle driver data by using the models. The anomalies are the outliers from the clusters generated with the models.

The system uses the identified anomalies in the driver data to label (608) the output of each model as SAFE or UNSAFE. A specific vehicle driver data point in a cluster of vehicle driver data can be labeled SAFE and indicate safe driver actions. A specific vehicle driver data point that is an anomaly outside the clusters can be labeled UNSAFE and indicate unsafe driver actions.

The system can calculate (610) a driver risk score by using the number of models labeled UNSAFE and using an ensemble scoring machine learning classifier. It should be readily apparent to one having ordinary skill that ensemble isolation forests are merely illustrative and any variety of processes to evaluate a collection of labeled machine learning classifiers to generate a driver risk score as appropriate to many embodiments. In various embodiments, a risk score can be calculated by using the following equation:

$$\text{Risk Score}(v_i) = \frac{100 \times \text{Num\_UNSAFE}}{n},$$

where $v_i$ is a set of vehicle driver data, n is a total number of models, and Num_UNSAFE is the number of models with an output of UNSAFE. The system can compare driver risk score to a threshold to determine what sort of risk it indicates. As an illustrative example, where driver risk scores can range from 0-100, a driver risk score of 9 can indicate a low level of risk and a driver risk score of 95 can indicate a high level of risk. However, it should be noted that the system can use any risk scoring range, including those where a risk score below a threshold value indicates a high risk and a risk score above a threshold value includes a low risk, as appropriate to the requirements of specific applications of embodiments.

In many embodiments, driver risk scoring processes can include sending safety control signals to a vehicle for the safe control thereof when a calculated driver risk score is at or above a predetermined threshold. As an illustrative example, these safety control signals can (but are not limited to) impose limitations on vehicle speed and/or minimum driving distances from other vehicles, force a vehicle to change from a user-controlled driving mode to a self-driving mode, and/or alert other drivers to the unsafe driver by for example (but not limited to) honking a vehicle horn and/or flashing vehicle headlights until a driver stops, shuts off, and/or exits the vehicle.

Accordingly, the system can use a variety of processes to generate drive risk scores by using machine learning classifiers (such as isolation forests) and then to control the operation of a vehicle, in accordance with embodiments.

Figure 7:
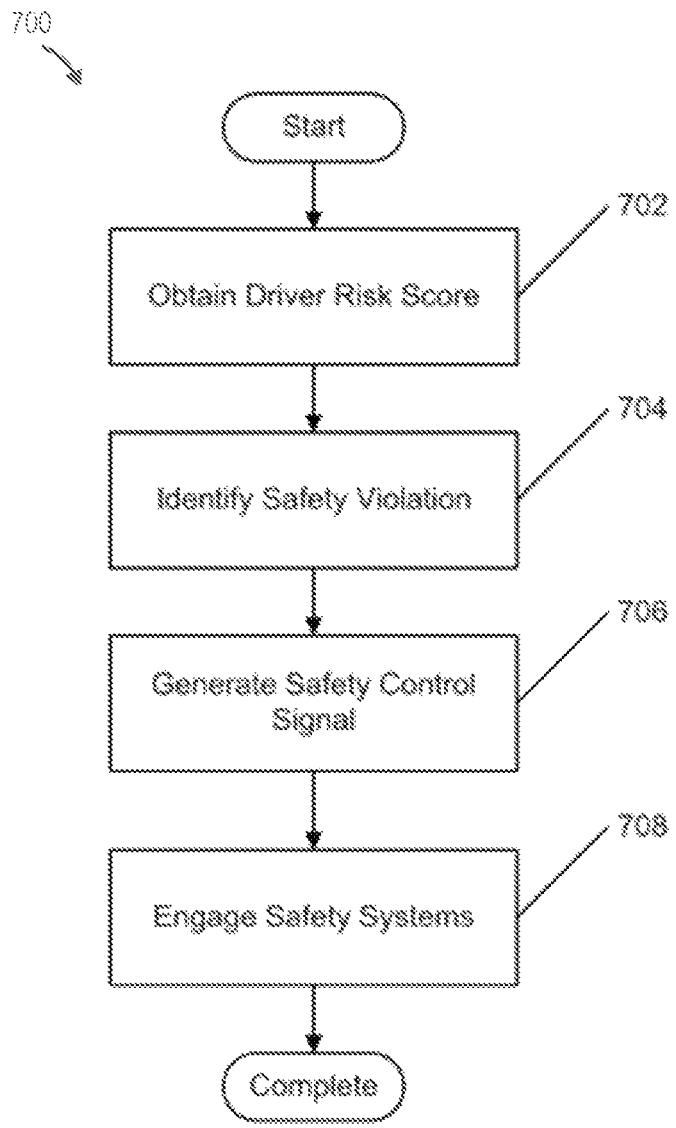
FIG. 7 is a flowchart of a method for engaging vehicle safety systems based on a driver risk score, in accordance with yet another embodiment.

FIG. 7 is a flowchart of a method 700 for engaging a vehicle safety system based on a driver risk score, in accordance with an embodiment. The system obtains, receives, or calculates (702) a driver risk score. Calculation of driver risk score is discussed with reference to FIG. 6. The system identifies (704) one or more safety violations based on the driver risk score and/or the raw data received from a vehicle telematics device associated with the vehicle. For example, the system may identify the vehicle is traveling at one hundred miles per hour. The system generates (706) one or more safety control signals based on the identified safety violation. For example, the system can generate a safety control signal to instruct the engine (e.g., via an engine control unit coupled to the processor) to reduce rotations per minute (rpm).

The system engages (708) one or more safety systems based on the one or more safety control signals. For example, the system slows the rpm of the engine based on a safety control signal, and thereby slows down (e.g., reduces velocity) the vehicle. As another example, the system can include, or communicate with, a display device and/or an audio device mounted in the vehicle and coupled to the processor to alert the driver of the unsafe driving, based on a safety control signal. As another example, the system can be coupled to the braking system of a vehicle (e.g., via an antilock brake control unit coupled to the processor) to apply the brakes and further slow down the vehicle based on the control signal. As another example, the system can be coupled to the transmission system of a vehicle (e.g., via a transmission control unit coupled to the processor) to shift down to a lower gear to slow down the vehicle, based on the control signal. As another example, the system can be coupled to the ignition system of a vehicle (e.g., via an ignition or engine control unit coupled to the processor) to shut the engine off, perhaps after bringing the vehicle to a stop at a safe location, based on the control signal. The vehicle can be temporarily disabled from operation in this case. As another example, the safety system can be coupled to an autonomous driving (e.g., autopilot) system coupled to the processor to engage the autopilot based on the safety control signal to automatically drive the vehicle to a safe location.

Unsupervised machine learning has several advantages. A first advantage is the "rules" that have been learned reflect the dataset and the dataset only. For example, the "rules" are not arbitrary manually-inputted definitions and do not reflect human biases. A second advantage is online learning. For example, the system can learn from a plurality of vehicle telematics devices in real time or not real time, as appropriate. A third advantage is an administrator can quickly and easily add a new feature (e.g., hard reversing or whatever) or remove an unwanted feature (e.g., acceleration or whatever). The quick adding or removal of features enables rapid geographic segmentation and learning.

Although the embodiments have been described in certain specific aspects, many additional modifications and variations would be apparent to those skilled in the art. In particular, any of the various processes described herein can be performed in alternative sequences and/or in parallel (on the same or on different computing devices) in order to achieve similar results in a manner that is more appropriate to the requirements of a specific application. It is therefore to be understood that the embodiments that are disclosed can be practiced otherwise than specifically described without departing from the scope and spirit of this disclosure. Thus, the embodiments should be considered in all respects as illustrative and not restrictive. It will be evident to the person skilled in the art to freely combine several or all of the embodiments discussed here as deemed suitable for a specific application. Throughout this disclosure, terms like "advantageous", "exemplary" or "preferred" indicate elements or dimensions that are particularly suitable (but not essential) to one or more embodiments, and may be modified wherever deemed suitable by the skilled person, except where expressly required. Accordingly, the scope of the embodiments should be determined not by those illustrated and described, but by the appended claims and their equivalents.

The invention claimed is:

1. A method of engaging a vehicle safety system in a vehicle, the method comprising:
   obtaining a driver risk score;
   identifying a safety violation based on data received from a vehicle telematics device in the vehicle;
   generating a safety control signal based on the safety violation;
   engaging a safety system based on the safety control signal;
   obtaining a sensor data from one or more sensor devices in the vehicle; and
   confirming that the safety system has responded to the safety control signal based upon the obtained sensor data.

2. The method of claim 1, wherein engaging the safety system includes instructing an engine to reduce rotations per minute of the engine thereby reducing velocity of the vehicle.

3. The method of claim 2, wherein engaging the safety system includes instructing a braking system of the vehicle to apply brakes to reduce velocity of the vehicle.

4. The method of claim 2, wherein engaging the safety system includes instructing a transmission system of the vehicle to shift to a lower gear to reduce velocity of the vehicle.

5. The method of claim 4, wherein engaging the safety system includes instructing an ignition system of the vehicle to shut off the engine so that the vehicle is temporarily disabled from operation.

6. The method of claim 1, wherein engaging the safety system includes instructing an autonomous driving system to become engaged based on the safety control signal to automatically drive the vehicle to a safe location.

7. The method of claim 1, wherein engaging the safety system includes instructing a display device and/or an audio device mounted in the vehicle to visually and/or audibly alert a driver of unsafe driving behavior.

8. The method of claim 1, further comprising disengaging the safety system in response to confirmation that the safety system has responded to the safety control signal.

9. The method of claim 1, wherein identifying the safety violation comprises identifying the safety violation based on the data received from the vehicle telematics device and the driver risk score.

10. The method of claim 1, wherein obtaining the driver risk score comprises calculating the driver risk score based on the data received from the vehicle telematics device.

11. The method of claim 10, wherein calculating the driver risk score comprises:
    identifying anomalies in the data received from the vehicle telematics device using an unsupervised machine learning process based upon a baseline set of vehicle driver data; and
    calculating the driver risk score using the anomalies identified in the data received from the vehicle telematics device.

12. The method of claim 1, wherein obtaining a driver risk score comprises receiving the driver risk score from a remote server.

13. The method of claim 1, wherein the data received from the vehicle telematics device comprises a speed of the vehicle, an acceleration of the vehicle, a deceleration of the vehicle, or an indication that the vehicle is swerving.

14. The method of claim 1, wherein identifying the safety violation based on data received from a vehicle telematics device comprises comparing the data to a reference threshold value.

15. The method of claim 14, wherein the reference threshold value is dependent on the driver risk score.

16. The method of claim 1, wherein:
generating a safety control signal comprises generating a plurality of safety control signals based on the safety violation, and
engaging the safety system comprises engaging a plurality of safety systems based on the plurality of safety control signals.

17. The method of claim 1, wherein
generating a safety control signal comprises generating a first safety control signal based on the safety violation, engaging the safety system comprises engaging a first safety system based on the first safety control signal, and further comprising:
generating a second safety control signal based on the safety violation; and
engaging a second safety system based on the second safety control signal, wherein the second safety system is different from the first safety system.

18. The method of claim 17, further comprising:
obtaining sensor data from one or more sensor devices in the vehicle; and
confirming, based on the obtained sensor data, that (i) the first safety system has responded to the first safety control signal and (ii) the second safety system has responded to the second safety control signal.

19. The method of claim 18, further comprising disengaging (i) the first safety system in response to confirmation that the first safety system has responded to the first safety control signal and (ii) the second safety system in response to confirmation that the second safety system has responded to the second safety control signal.

* * * * *